Feb. 28, 1933.  J. J. KLEIN  1,899,698
ATOMIZER
Filed Dec. 21, 1929  5 Sheets-Sheet 1
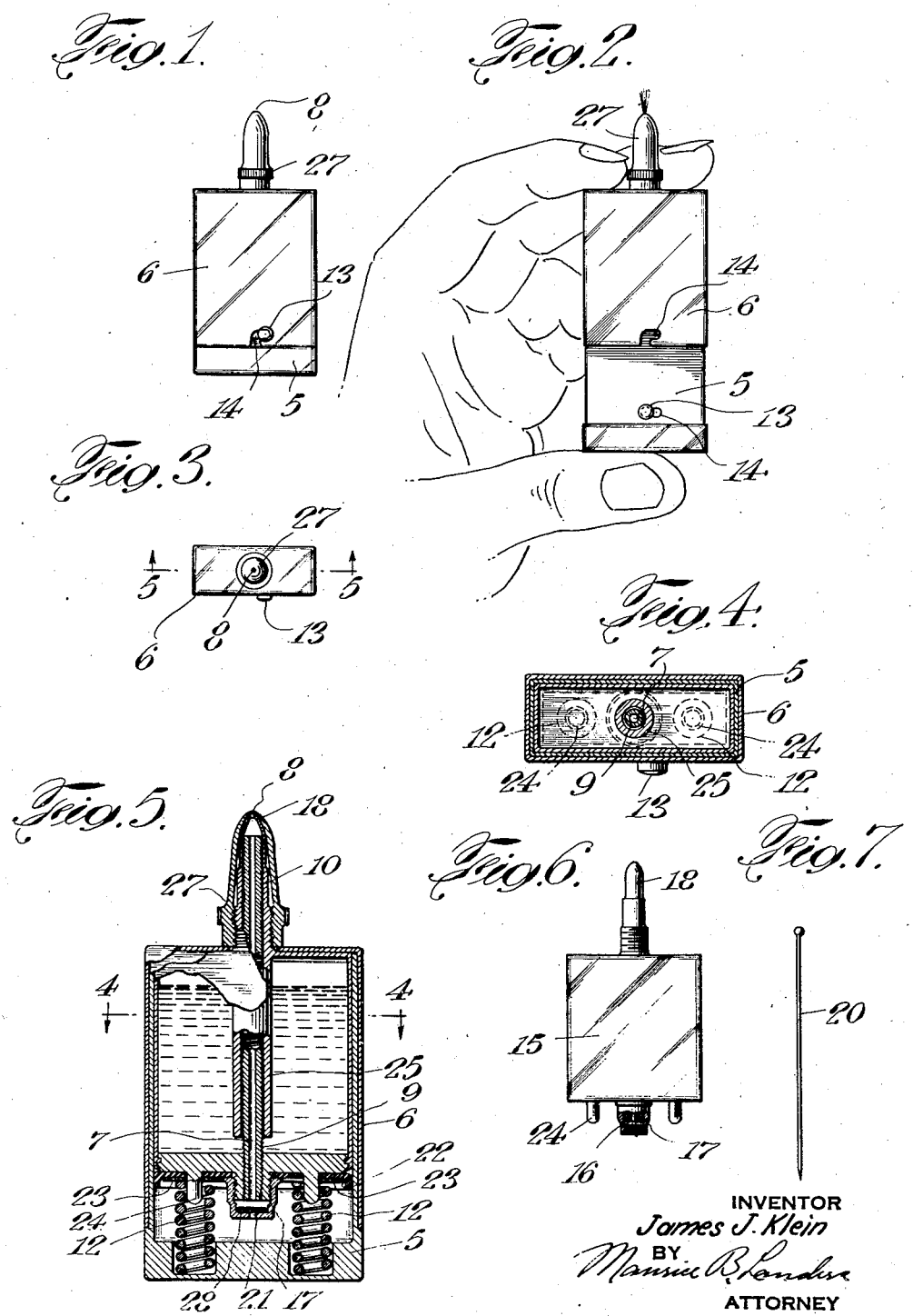
INVENTOR
James J. Klein
BY
ATTORNEY Feb. 28, 1933.   J. J. KLEIN   1,899,698
ATOMIZER
Filed Dec. 21, 1929   5 Sheets-Sheet 2

INVENTOR
James J. Klein
BY
Maurice B. Landers
ATTORNEY

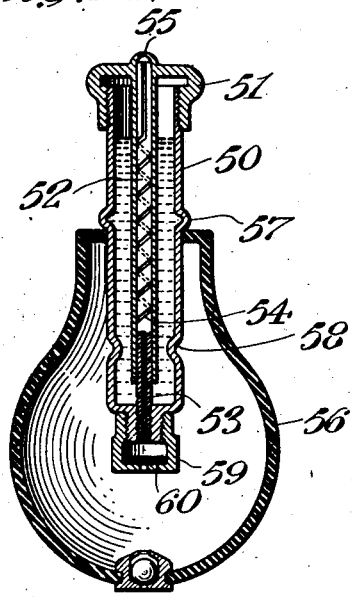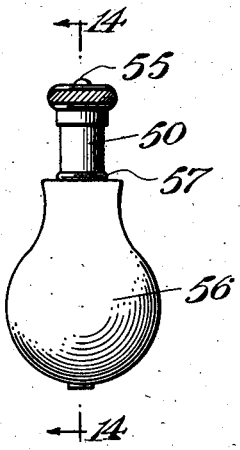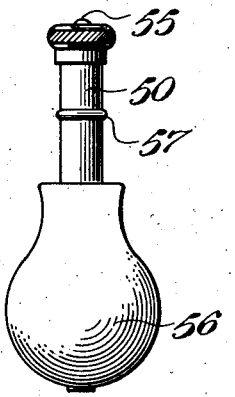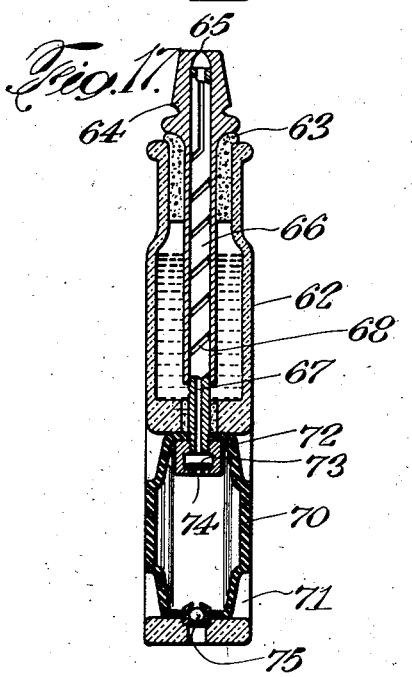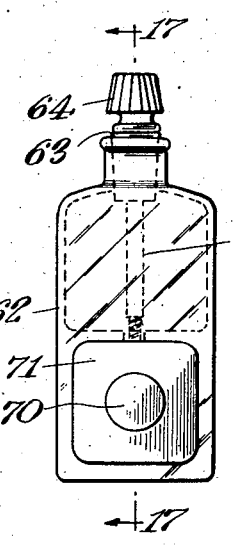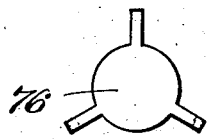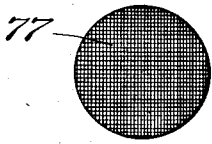

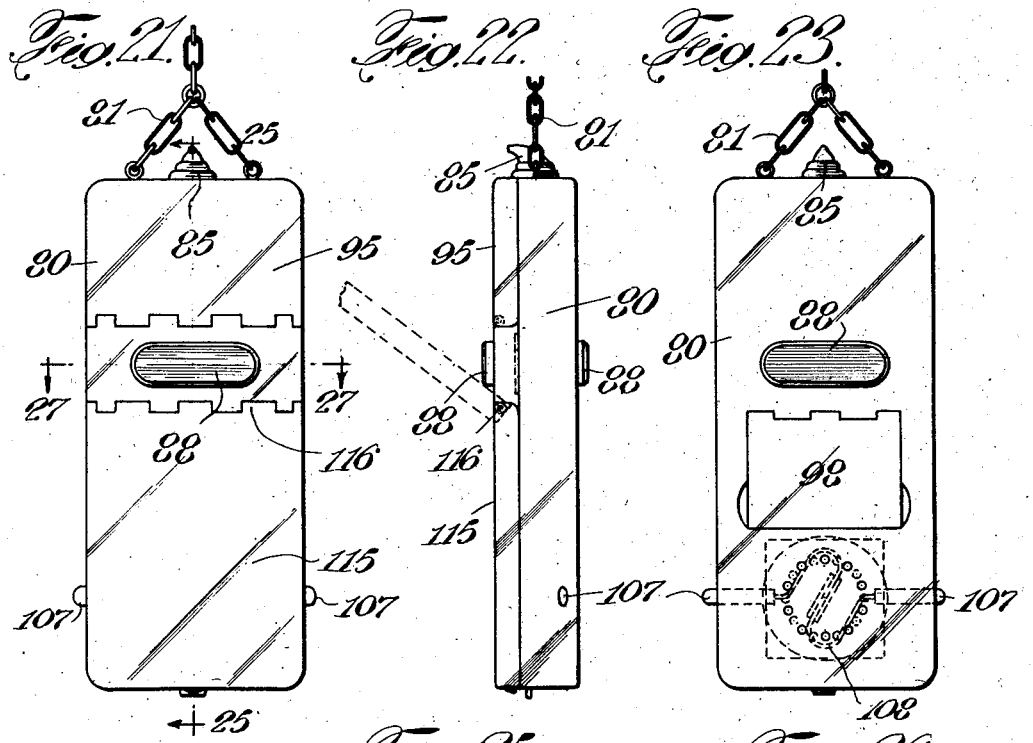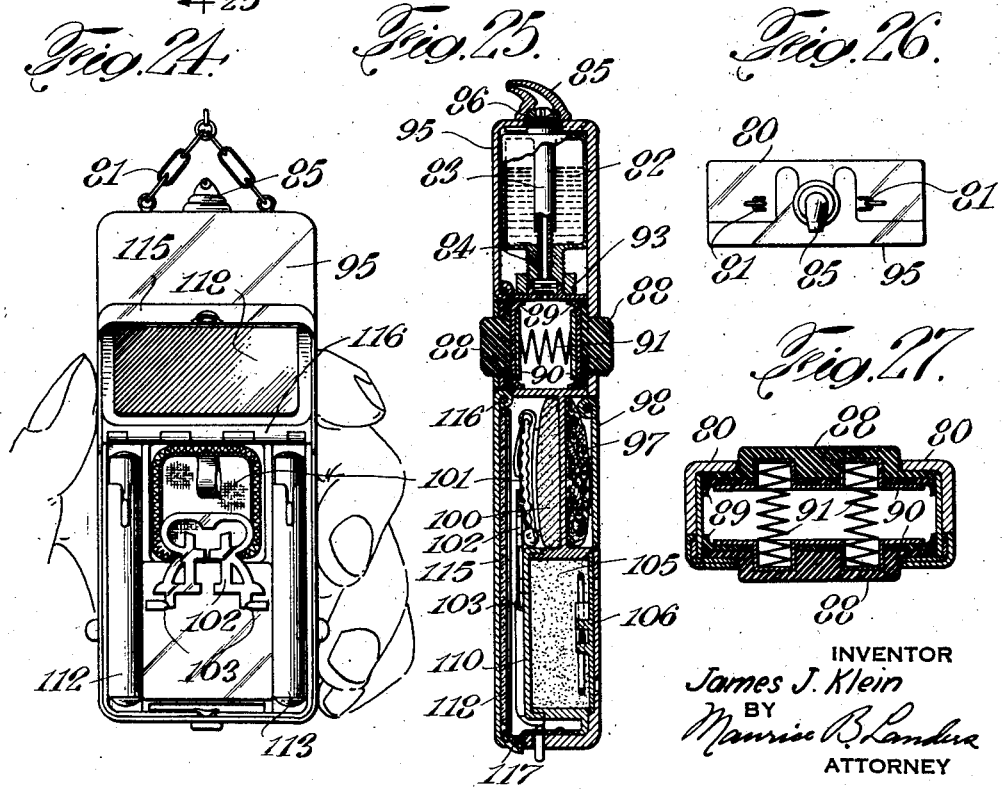

Feb. 28, 1933.　　　　J. J. KLEIN　　　　1,899,698
ATOMIZER
Filed Dec. 21, 1929　　5 Sheets-Sheet 5
Fig.28.　　Fig.29.　　Fig.30.　　Fig.31.
Fig.32.　　Fig.33.　　Fig.34.　　Fig.35.
Fig.36.　Fig.37.　Fig.38.　Fig.39.
INVENTOR
James J. Klein
BY
Maurice B. Landus
ATTORNEY Patented Feb. 28, 1933

1,899,698

UNITED STATES PATENT OFFICE

JAMES J. KLEIN, OF BROOKLYN, NEW YORK

ATOMIZER

Application filed December 21, 1929. Serial No. 415,631.

The present invention has for an object to provide an improved atomizer and more particularly an atomizer which will be compact and well adapted to be included as one of the fittings of a vanity case.

The nature and objects of the invention will be better understood from a description of a particular illustrative embodiment thereof for the purpose of which description reference should be had to the accompanying drawings forming a part hereof and in which—

Figure 8:
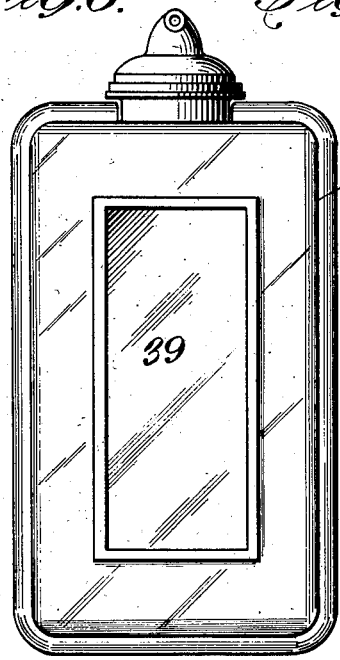
Figure 9:
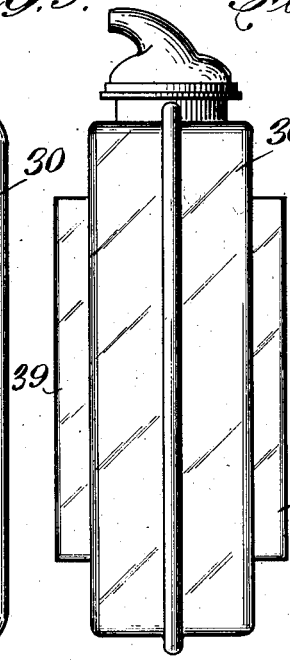
Figure 10:
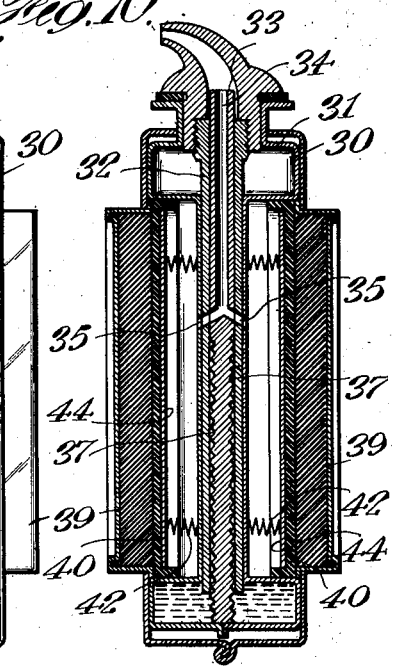
Figure 11:
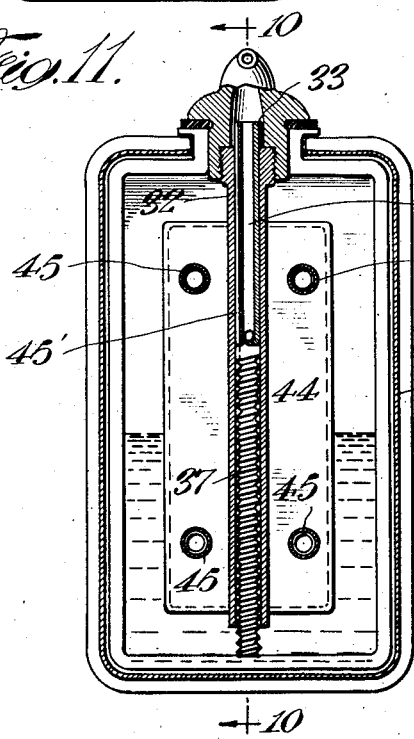
Figure 12:
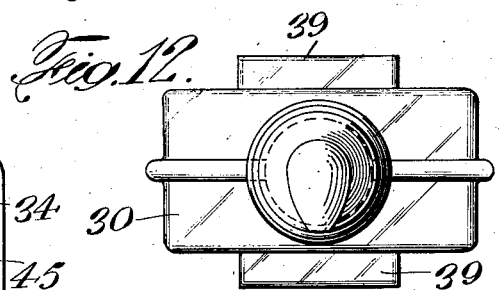
Figure 13:
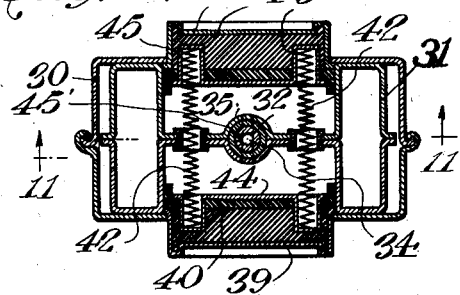

Figure 1 is a side view of an atomizer embodying the invention, the parts being shown in close compacted relation, Fig. 2 is a view of the same showing the atomizer in operation, Fig. 3 is a top plan view, Fig. 4 is a horizontal sectional view taken on the line 4—4 of Fig. 5, Fig. 5 is a vertical sectional view taken on the line 5—5 of Fig. 3, Fig. 6 is a side view of a removable cartridge forming a part of the vanity case, Fig. 7 shows a pin to be used in puncturing the seal of the cartridge, Figs. 8, 9 and 10 are, respectively, front, side and sectional views of another embodiment of the invention, the position of the section of Fig. 10 being indicated at 10—10 in Fig. 11, Fig. 11 is a sectional view taken at right angles to the section of Fig. 10, as shown at 11—11 in Fig. 13, Fig. 12 is a top plan view, Fig. 13 is a horizontal sectional view, Fig. 14 is a central sectional view of an atomizer having a bulb for operation thereof, taken on the line 14—14 of Fig. 15.

Fig. 15 is a side view of the atomizer of Fig. 14 showing the bulb in one position, Fig. 16 is a similar view but showing the parts in a different position, Fig. 17 is a central sectional view taken on the line 17—17 of Fig. 18 of an atomizer having another type of bellows, Fig. 18 is a side view of the atomizer shown in Fig. 17 drawn to a smaller scale, Figs. 19 and 20 are detail views of parts of the atomizer check valves, Fig. 21 is a front view of a vanity case incorporating the improved atomizer as one of the fittings, Fig. 22 is a side view of the same, Fig. 23 is a rear view of the same, Fig. 24 is a front view showing one of the covers lifted to show fittings of the vanity case, Fig. 25 is a central sectional view of the same, Fig. 26 is a top plan view of the case, Fig. 27 is a horizontal sectional view of the bellows, Figs. 28 to 35 are detail views showing threaded tubular members any one of which may be used in the atomizer to control the flow of perfumery or other material with which the atomizer is loaded, and Figs. 36 to 39 are end views of the alternative parts shown in Figs. 28 to 31.

The atomizer shown in Figs. 1 to 7 comprises a two-part casing, the parts of which move telescopically and in so moving act as a pump or bellows to force air through the atomizer. As shown the inner part 5 is movable in the outer part 6 to pump air through a central channel 7 to the nozzle outlet 8 thereby drawing the perfume or other material to be atomized along the thread 9 on the exterior of the tubular member 10, springs 12 act to separate the two parts and in operation pressure is applied longitudinally to force the parts together against the action of said springs in the performance of the pumping operation. It is desirable to provide means for holding or locking the telescoping members of the casing in compact relation when not in operation and to this end a sliding button 13 is arranged to be received in a bayonet slot 14 provided for this purpose.

Preferably the construction comprises a replaceable cartridge 15 which may be supplied fully charged with perfume and sealed for shipment by a cork disk 16 within the cap 17 at one end of the cartridge and by forming the inner nozzle tip 18 at the other end imperforate but of thin metal whereby previous to the cartridge being inserted within the atomizer the cork disk may be removed and the nozzle perforated by means of a pin 20 inserted through a hole 21 in the cap 17 and passed longitudinally through the bore 7.

An air seal is maintained between the end of the cartridge and the inner wall of the movable telescoping member 5 by means of a washer 22 provided for this purpose. The washer may be held in place by the cap 17 fitting thereover and by means of metal washers 23 fitting over the pins 24 that carry the springs 12.

The tubular member 10 fits within a sleeve 25 and may have on its exterior a thread of any desired pitch and cross-sectional area to permit a restricted flow of perfume therealong and to the nozzle 8. Tubular members having threads or grooves of different cross-sectional shape and of different pitch are shown in Figs. 28 to 39 for purposes of illustration.

A nozzle member or cap 27 is screwed on to the outer end of the tubular member 25 where it projects beyond the body of the casing and clamps the outer casing member 6 in fixed position relative to the inner cartridge member. A rubber or equivalent valve member 28 is inserted within the cap 17 to prevent flow of the air outwardly through the hole 21 when the telescopic member 25 is being retracted by the springs 12. The inner face of the cap is so formed that this rubber disk will seat tightly thereagainst whereas the opposite face of the disk or the surface engaged thereby is so formed as to prevent an air-tight seating.

The atomizer shown in Figs. 8 to 13 is in general of equivalent construction but is different in structural details. This atomizer comprises an outer casing 30 with an inner perfume carrying casing 31 formed to receive a central sleeve 32. Within this sleeve is a separate member 33 having a central bore 34 extending from its upper end to a central point where lateral passages 35 extend outwardly and register with corresponding apertures through the sleeve 32 and the wall of the casing 31 adjacent thereof. This member 33 has also threads or grooves 37 extending from the passages 35 downward to its lower end to carry perfume or the like from the inner container 31 upwardly within the sleeve 32, and a straight groove 45′ along its upper portion.

An air bellows is provided for forcing air into the passages 35 and through the bore 34 to atomize perfume which will be drawn through the passages 37. In the construction shown the bellows consists of side members 39 with washer member 40 sliding within the side recesses of the casing 31 as best shown in Figs. 10 and 13. Springs 42 are arranged to move these side members outwardly so that they can be operated to pump air by mere pressure thereon. Washers 40 are reinforced by suitable metal plates 44 which preferably are recessed as indicated at 45 to receive the ends of the springs 42. As shown in Fig. 13 the two parts of the inner casing 31 are secured together by eyelet rivets and the springs 42 extend therethrough.

The atomizer shown in Figs. 17 and 18 embodies the same principles. As shown, a container 62 is provided with a stopper 63 having a central sleeve 64 extending nearly to the bottom of the container and formed at its top with a nozzle 65. Within this sleeve is a tubular member 66 having a central bore 67 and an exterior spiral groove 68 which extends through the bottom of the container. In use the perfume will be drawn along the spiral groove and atomized at the top of this member for discharge through the nozzle 65 by a stream of air forced through the central bore 67. To this end a bellows 70 is fitted within the recess 71 in the container, a tight connection between the bellows and the perfume container being made by a cap nut 72 threaded on to the lower end of the member 66. Within this cap nut is a valve 73 arranged, when in the position shown, to close the central aperture 74 of the cap nut but so arranged that when in its upper position it will not prevent flow of air into the bore 67. A check valve 75 is provided at the lower end of the bellows.

In Figs. 19 and 20 are shown, respectively, a metal plate 76 and rubber disk 77 constituting the valve 73. As shown the metal plate 76 having a relatively small centre portion and three legs is positioned above the rubber disk 77. When pressed downward, Fig. 17, by flow of air in that direction the rubber disk seals the aperture 74. When the air flow is in the opposite direction, the rubber disk lifts. The metal plate 76 is ordinarily not lifted against the lower end of the tubular member 66 but even if it were air could still pass as the plate and member do not fit closely enough to form a seal.

The vanity case shown in Figs. 21 to 27 combines an atomizer constructed in accordance with the principles above set forth with cosmetics in a convenient compact case. As shown, the vanity case comprises a casing 80 which may conveniently be suspended by a chain 81 and in this casing is an atomizer comprising a refill cartridge 82 carrying perfume and having a central sleeve 83 with a tubular member 84 formed with a central bore and an exterior spiral groove. A nozzle 85 preferably formed to provide an outlet extending at right angles to the length of the case is threaded on to the projecting upper end of the sleeve 83 as indicated at 86. A bellows is shown as built into the casing comprising opposed plunger members 88 each comprising a washer 89 and an inner plate 90 against which plate a separating spring 91 presses. This bellows is arranged to be operated by the pressure of the fingers operating in opposition to the springs 91 to pump air to a suitable valve formed in a casing and into the central bore of the atomizer. As shown the atomizer is removably secured in the casing by a nut 93 engageable with a thread formed on the bottom of the atomizer cartridge and a companion thread formed on a boss within the casing. The cartridge can be removed through the side of the casing upon opening a door 95 provided for this purpose. If desired, the nozzle 85 may be so arranged as to clamp the door 95 in closed position. A suitable check valve is provided between the bellows chamber and the bottom of the atomizer as clearly shown in Fig. 25.

A pocket is provided for a powder puff 97 and a hinged cover 98 affords convenient access thereto. Opposite this pocket a companion pocket is provided for a rouge compact 100 against which compact may be positioned a rouge puff 101 which conveniently may be held in place by a clamp 102 hinged at 103. Adjacent the powder puff and rouge pockets is a powder box 105 formed with a sifter arrangement comprising a perforated disk 106 the perforations of which may be moved into alignment with mating perforations in the side of the casing by means of plungers 107 connected to a central spring 108 substantially shown in Patent No. 1,739,678, granted to me December 17, 1929. This powder box is provided with a tight fitting removable cap cover 110 to which the clamp 102 is hinged. At either side of the powder puff and rouge compartments and of the powder box are compartments for an eyebrow pencil 112 and lipstick 113.

Access to the rouge puff and compact, the powder box and the eyebrow pencil and lipstick may be had through a hinged cover 115 hinged at 116 and normally held in closed position by a spring catch 117. The inner face of the hinged cover is formed with a mirror 118.

The foregoing particular description is illustrative merely and is not intended as defining the limits of the invention.

In Figs. 14, 15 and 16 is shown a form of atomizer in which a rubber bulb is used as a bellows. This atomizer comprises a casing 50 with a cap 51 having formed therewith a sleeve projecting downwardly into the casing. Within this sleeve is positioned a tubular member 52 having a central bore 53 for flow of air and an exterior groove or thread 54 for flow of perfume or the like. The cap 51 is also formed with a small perforation 55 suitably aligned with the bore of the central member 52. The tubular member 52 is threaded into the lower end of the casing 50 and projects exteriorly to permit air to be forced through the bore by a bulb 56 provided for the purpose. This bulb may be either positioned as shown in Fig. 14 against a shoulder 57 formed on the casing and limiting its inward movement or it may be retracted so that it engages within the groove 58. The bulb 56 is shown in its two alernative positions on casing 50 in Figs. 15 and 16 and it will be understood that the bulb may be operated effectively in either position although the capacity of the bulb in these two positions will differ.

A cap 59 is provided over the lower end of the casing 50 and a suitable valve 60 is provided therein to permit flow of air inwardly but not outwardly.

I claim :—

1. An atomizer comprising, in combination, a casing having a nozzle, a sleeve leading from said nozzle to the interior of the casing, a tubular member fitting within the sleeve and formed with a central bore and an exterior helical groove for conducting liquid to the nozzle and a bellows adapted to force air through said central bore and thereby draw liquid through the helical groove and atomize the same.

2. A perfume atomizer comprising, in combination, a casing providing a perfume container and a bellows chamber with a nozzle connected to said container, a sleeve extending from said nozzle through the bellows chamber into the perfume container, a tubular member within said sleeve formed with a central bore for a portion of its length and with an exterior helical groove extending for the rest of its length and into said perfume container, said tubular member and sleeve being formed with registering lateral apertures connecting the bore of the tubular member with the interior of the bellows chamber together with bellows members for pumping air through said bore to the nozzle.

3. An atomizer comprising, in combination, a nozzle, a casing providing a perfume container and a bellows chamber, a bellows within said bellows chamber, connections comprising a sleeve projecting into said perfume container and a tubular member fitted within said sleeve having a central bore connected to said bellows and leading to said nozzle and an exterior helical groove also leading to said nozzle for conducting perfume from said perfume container to said nozzle.

4. An atomizer of the character described comprising a nozzle, a casing constituting a liquid container, a central sleeve leading from said nozzle to the interior of the casing, a tubular member fitting within the central sleeve having a central bore forming an air passage to the nozzle and a helical groove extending circumferentially for conducting liquid from the casing to the air passage, the pitch of the helix being adapted to the character of the particular material to be atomized, and means for forcing air through said central bore and thereby drawing liquid through the helical groove to atomize the same, substantially as described.

5. An atomizer of the character described comprising a nozzle, a casing constituting a liquid container, a central sleeve leading from said nozzle to the interior of the casing, a tubular member fitting within the central sleeve having a central bore forming an air passage to the nozzle and a helical groove extending circumferentially for conducting liquid from the casing to the air passage, the pitch of the helix being adapted to the character of the particular material to be atomized, said casing being formed on opposite sides with two exterior recesses communicating with each other and with the bore of the tubular member, and bellows members operable in said recesses to force air into and through said central bore and thereby draw liquid through the helical groove and atomize the same, substantially as described.

In testimony whereof, I have signed my name to this specification this 6th day of December, 1929.

JAMES J. KLEIN.